US010489958B1

(12) United States Patent
Mallet et al.

(10) Patent No.: US 10,489,958 B1
(45) Date of Patent: *Nov. 26, 2019

(54) FACIAL ANIMATION MODELS

(71) Applicant: LUCASFILM ENTERTAINMENT COMPANY LTD., San Francisco, CA (US)

(72) Inventors: Ronald Mallet, Mill Valley, CA (US); Yuting Ye, San Francisco, CA (US); Michael Koperwas, San Francisco, CA (US); Adrian R. Goldenthal, San Francisco, CA (US); Kiran S. Bhat, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/666,286

(22) Filed: Aug. 1, 2017

Related U.S. Application Data

(63) Continuation of application No. 13/839,243, filed on Mar. 15, 2013, now Pat. No. 9,747,716.

(51) Int. Cl.
*G06T 13/40* (2011.01)

(52) U.S. Cl.
CPC .................................. *G06T 13/40* (2013.01)

(58) Field of Classification Search
CPC ............................... G06T 13/00; G06T 13/20
USPC ......................................................... 345/475
See application file for complete search history.

(56) References Cited

U.S. PATENT DOCUMENTS

| 8,035,643 | B2 | 10/2011 | Pighin et al. |
| 8,112,254 | B1 | 2/2012 | Bhat et al. |
| 8,207,971 | B1* | 6/2012 | Koperwas ............... G06T 13/40 345/473 |
| 8,854,376 | B1 | 10/2014 | Bhat et al. |
| 9,196,074 | B1 | 11/2015 | Bhat et al. |
| 2004/0179013 | A1 | 9/2004 | Menache |
| 2005/0008332 | A1 | 1/2005 | Ogikubo et al. |
| 2005/0083332 | A1* | 4/2005 | Hung ...................... G06T 13/40 345/473 |

(Continued)

OTHER PUBLICATIONS

Thomas Di Giacomo, Stephane Garchery, and Nadia Magnenat-Thalmann, "Expressive Visual Speech Generation", chapter two in Data-Driven 3D Facial Animation, Springer-Verlag London Limited 2008.*

(Continued)

*Primary Examiner* — Jin Ge
(74) *Attorney, Agent, or Firm* — Kilpatrick Townsend & Stockton LLP (57) ABSTRACT

A system includes a computing device that includes a memory configured to store instructions. The system also includes a processor configured to execute the instructions to perform a method that includes receiving multiple representations of an object. Each of the representations includes position information of the object and corresponds to an instance in time. For at least one of the representations, the method includes defining a contour that represents a movable silhouette of a surface feature of the object. The method also includes producing a deformable model of the surface of the object from the defined contour and from the at least one representation of the object.

19 Claims, 9 Drawing Sheets

(56) References Cited

U.S. PATENT DOCUMENTS

| | | |
|---|---|---|
| 2008/0170777 A1 | 7/2008 | Sullivan et al. |
| 2009/0066700 A1 | 3/2009 | Harding et al. |
| 2009/0195545 A1* | 8/2009 | Debevec ................ G06T 13/40 345/473 |
| 2010/0183228 A1* | 7/2010 | Matsuzaka ............ G06K 9/621 382/195 |

OTHER PUBLICATIONS

Bhat, Kiran et al., U.S. Appl. No. 13/361,350, filed Jan. 30, 2012, (unpublished), entitled "Facial Animation Models", 34 pages.
U.S. Appl. No. 13/839,243, "Final Office Action", dated Oct. 22, 2015, 27 pages.
U.S. Appl. No. 13/839,243, "Final Office Action", dated Nov. 21, 2016, 30 pages.
U.S. Appl. No. 13/839,243, "Non-Final Office Action", dated Jun. 4, 2015, 26 pages.
U.S. Appl. No. 13/839,243, "Non-Final Office Action", dated Apr. 27, 2016, 34 pages.
U.S. Appl. No. 13/839,243, "Notice of Allowance", dated Apr. 25, 2017, 29 pages.
Giacomo et al., "Expressive Visual Speech Generation", chapter two in Data-Driven 3D Facial Animation, Springer-Verlag London Limited, 2008.

* cited by examiner

FACIAL ANIMATION MODELS

CROSS REFERENCE TO RELATED APPLICATIONS

This application is a continuation of U.S. application Ser. No. 13/839,243, Filed Mar. 15, 2013, and entitled "FACIAL ANIMATION MODELS", which is hereby incorporated by reference, in its entirety.

TECHNICAL FIELD

This document relates to a system for producing animation models such as facial animation models.

BACKGROUND

Ever increasing computational power allows complex calculations to be tackled with increased efficiency in less time. For example, robust computer systems can execute applications to simulate objects such as fictional characters and even realistic-looking human forms. To visually present such seemingly realistic characters, a significant amount of detail may be included in the simulated objects (e.g., fine wrinkles on the forehead of a character, laugh lines, etc.). However, even with such detail included, the generated simulations may not appear completely realistic and may lack subtle nuances that even a casual viewer may find glaringly apparent and distracting from their viewing experience.

SUMMARY

The described systems and techniques are for improving the production of models (e.g., for use in creating an actor's or fictional character's face, etc.) to more closely match the performance of an actor. Along with using basic facial geometry and motion information captured from the performing actor's face, perceptually important contour features of the actor's face are also used for model production. Additionally, by adjusting the size and shape of a mouth included in a model to better match the actor's mouth, the lips represented by the model may better track the dialogue performed by the actor and improve the overall viewing experience.

In one aspect, a computer-implemented method includes receiving multiple representations of an object. Each of the representations includes position information of the object and corresponds to an instance in time. For at least one of the representations, the method includes defining a contour that represents a movable silhouette of a surface feature of the object. The method also includes producing a deformable model of the surface of the object from the defined contour and from the at least one representation of the object.

Implementations may include any or all of the following features. The computer-implemented method may also include adjusting the deformable model of the surface of the object if the deformable model is incapable of accurately presenting the at least one representation of the object. Adjusting the deformable model may include producing one or more corrective shapes for applying to the deformable model. Producing the deformable model may include defining an association between the contour that represents the movable silhouette of the surface feature and a mesh of vertices that represents the object. The computer-implemented method may also include producing an updated deformable model of the surface of the object from the produced deformable model and another contour defined from another one of the received multiple representations of the object. The at least one representation may correspond to a captured image of the object. The object may be an actor's face.

In another aspect, a computer-implemented method includes receiving multiple representations of the shape of an actor's mouth while dialogue is being delivered. For each representation, the method includes adjusting the geometry of a portion of a deformable model of an animated character to reduce the size of a portion of a mouth of the animated character. The method also includes generating an image of the animated character that presents the adjusted portions of the animated character's mouth.

Implementations may include any or all of the following features. Adjusting the geometry of the deformable model may include closing the portion of the deformable model. Adjusting the geometry of the deformable model may include defining a separation threshold for closing the portion of the deformable model.

In another aspect, a system includes a computing device that includes a memory configured to store instructions. The system also includes a processor configured to execute the instructions to perform a method that includes receiving multiple representations of an object. Each of the representations includes position information of the object and corresponds to an instance in time. For at least one of the representations, the method includes defining a contour that represents a movable silhouette of a surface feature of the object. The method also includes producing a deformable model of the surface of the object from the defined contour and from the at least one representation of the object.

Implementations may include any or all of the following features. The processor may be configured to execute the instructions to perform a method that includes adjusting the deformable model of the surface of the object if the deformable model is incapable of accurately presenting the at least one representation of the object. Adjusting the deformable model may include producing one or more corrective shapes for applying to the deformable model. Producing the deformable model may include defining an association between the contour that represents the movable silhouette of the surface feature and a mesh of vertices that represents the object. The processor may be configured to execute the instructions to perform a method that includes producing an updated deformable model of the surface of the object from the produced deformable model and another contour defined from another one of the received multiple representations of the object. The at least one representation may correspond to a captured image of the object. The object may be an actor's face.

In another aspect, a system includes a computing device that includes a memory configured to store instructions. The system also includes a processor configured to execute the instructions to perform a method that includes receiving multiple representations of the shape of an actor's mouth while dialogue is being delivered. For each representation, the method includes adjusting the geometry of a portion of a deformable model of an animated character to reduce the size of a portion of a mouth of the animated character. The method also includes generating an image of the animated character that presents the adjusted portions of the animated character's mouth.

Implementations may include any or all of the following features. Adjusting the geometry of the deformable model may include closing the portion of the deformable model. Adjusting the geometry of the deformable model may include defining a separation threshold for closing the portion of the deformable model.

In another aspect, a computer program product tangibly embodied in an information carrier and comprising instructions that when executed by a processor perform a method that includes receiving multiple representations of an object. Each of the representations includes position information of the object and corresponds to an instance in time. For at least one of the representations, the method includes defining a contour that represents a movable silhouette of a surface feature of the object. The method also includes producing a deformable model of the surface of the object from the defined contour and from the at least one representation of the object.

Implementations may include any or all of the following features. The computer program product may include instructions that when executed by a processor perform a method that includes adjusting the deformable model of the surface of the object if the deformable model is incapable of accurately presenting the at least one representation of the object. Adjusting the deformable model may include producing one or more corrective shapes for applying to the deformable model. Producing the deformable model may include defining an association between the contour that represents the movable silhouette of the surface feature and a mesh of vertices that represents the object. The computer program product may include instructions that when executed by a processor perform a method that includes producing an updated deformable model of the surface of the object from the produced deformable model and another contour defined from another one of the received multiple representations of the object. The at least one representation may correspond to a captured image of the object. The object may be an actor's face.

In another aspect, a computer program product tangibly embodied in an information carrier and comprising instructions that when executed by a processor perform a method that includes receiving multiple representations of the shape of an actor's mouth while dialogue is being delivered. For each representation, the method includes adjusting the geometry of a portion of a deformable model of an animated character to reduce the size of a portion of a mouth of the animated character. The method also includes generating an image of the animated character that presents the adjusted portions of the animated character's mouth.

Implementations may include any or all of the following features. Adjusting the geometry of the deformable model may include closing the portion of the deformable model. Adjusting the geometry of the deformable model may include defining a separation threshold for closing the portion of the deformable model.

Various implementations of the subject matter described here may provide one or more of the following potential advantages. In one implementation, information from one or more contours present in an actor's face are used to produce a more detailed and realistic model capable of representing facial expressions of the actor. To more accurately retarget lip motion of a performing actor, the size of the mouth represented by a model is adjusted to more closely match the actor's mouth, thereby providing more realistic representations and nearly readable lips to an end viewer.

Details of one or more implementations are set forth in the accompanying drawings and the description below. Other features, aspects and advantages will be apparent from the description and drawings, and from the claims.

DETAILED DESCRIPTION

Digital characters, both humans and creatures, are becoming prevalent in feature films and video games, often times performing alongside human actors on screen. With realistically rendered images, modelers, animators, editors, etc. strive to deliver believable facial animations. In general, human viewers rely heavily on facial expressions for non-verbal communications. For example, subtle expressions are helpful to decipher emotions; and lip reading often assists viewers in understanding dialogues. Even the slightest dissonance between facial cues and viewers' expectations may convey false emotions. One or more techniques may be implemented for animating substantially realistic facial expressions. For example, from images of facial expressions collected by a camera, an array of cameras or other types of collection devices (e.g., an optical scanner), or through other techniques (e.g., electronically drawn, etc.), position information may be computed from the expressions and processed to produce an animation model (e.g. an adjustable three dimensional numerical mesh) that mathematically defines the shape of the underlying asset. Once produced, the model can be used for various applications. For example, along with producing nearly identical representations of the collected facial expressions (used to produce the model), the animation model may be used for tracking and transferring the facial performance of the actor to an animated character (in a process referred to as re-targeting) along with other applications.

Figure 1:
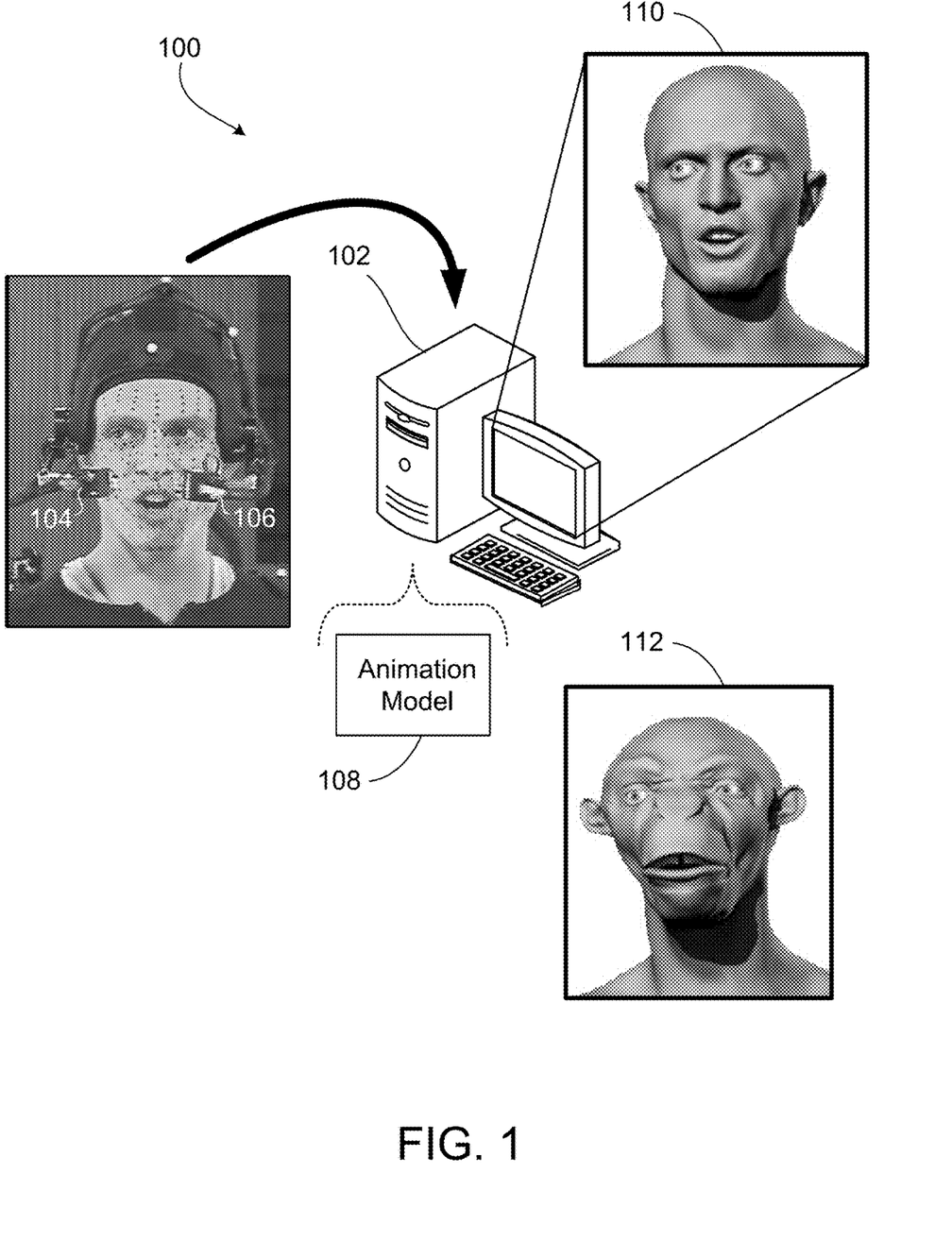
FIG. 1 illustrates a system for using a model to animate a character from facial motion information collected from an actor's face.

Referring to FIG. 1, a block diagram of an animation system 100 is presented that captures facial expressions of an actor and uses the captured information to efficiently produce an animation model that is capable of representing the captured expressions (along with other expressions). By processing the captured expressions together, an animation model can be constructed that may be capable of accurately representing the facial expressions in the captured imagery. One or more techniques may be implemented for collecting facial expressions from an actor, for example, an image capture system may be implemented in which a relatively sparse set of features associated with the actor's face is used for attaining position information (e.g., represented in a rectangular coordinate system). Such features may be highlighted artificially (e.g., with markers attached to locations on an actor's face, fluorescent paint applied to portions of a face, etc.), natural facial features (e.g., wrinkles located in the corner of an eye, the ridge of an actor's nose, etc.), combinations of artificial and natural facial features, etc. that are included in the imagery (e.g., captured at different camera views or perspectives). Once attained, the position information may be used for constructing the animation model of the actor's face, e.g., for presenting representations of the facial expressions included in the captured images along with other facial expressions.

As illustrated in the figure, an animation system 100 is capable of capturing imagery (e.g., facial expressions of a performing actor) and creating one or more animation models for a variety of applications (e.g., re-targeting the actor's performance onto a representation of a fictional character's face). In this arrangement, a computer system 102 is in communication with an array of cameras (e.g., represented by the head-mounted pair of cameras 104, 106) that can be used to capture images (e.g., from two distinct perspectives) of the actor's face and provide data that represents the imagery to the computer system. In this example, artificial markers have been applied to the actor (e.g., adhered in a pattern across the actor's face) to highlight facial features, however, other methodologies may be implemented (e.g., applying one or more paints to the actor's face, etc.), or, highlighting techniques may not be used in some situations (e.g., facial features may be distinct enough that artificial highlighting is not needed).

In general, the sparse set of markers may be unable to provide sufficient detail to reconstruct the small nuances used by the actor to convey subtle emotions. For example, areas around the eyelids and the mouth are often found to be problematic due to frequent self-occlusions seen from the camera. Based on the missing detail and not correctly conveying the emotion, additional time may be needed from animators, editors, etc. to manually add in the appropriate level of needed detail. Rather than relying on such time consuming manual operations to apply corrective action, the animation system 100 is able to capture such nuances also by using silhouette contours that represent moveable boundaries of the actor's skin (e.g., the actor's eyelids, inner mouth, etc.). In general, matching the movement of a given occluding contour is difficult because its location on the skin may be often change position and in some instances, rapidly or constantly change position. However, using one or more such contours, an animation model may be produced that is capable of more effectively matching the actual shape and motion of the actor's facial features such as lips during dialogue and more appropriately replicating eye blinks.

The animation model produced from these contours along with other information may be realized in a variety of forms. For example, the model may implement a collection of deformable geometries that correspond to shapes of the actor's face (e.g., shapes patterned after human facial muscles). Such shapes (referred to as blendshapes) have geometries that may be adjusted (e.g., weighted) so the model to is able to represent a particular facial expression (included in the actor's performance) from a range of expressions. While such blendshapes can provide an editable animation that substantially matches the actor's performance, linear combinations of the blendshapes often cannot accurately reproduce complex nonlinear interactions of the actor's skin. To address the situation, the computer system 102 takes corrective action by producing one or more additional shapes (referred to as corrective shapes) that are applied to the base blendshapes for accurately representing the captured facial expressions. One or more techniques or methodologies may be implemented to produce such corrective shapes. For example, using spatial wavelet basis functions, a pseudo-inverse solver technique may be implemented to produce wavelet basis functions that provide corrective shapes. In some situations, corrective shapes are often needed to address two or more potentially conflicting base blendshapes. While interfering blendshapes may provide a basis for introducing one or more corrective shapes, such corrective shapes may also be introduced due to other sources that cause presented facial expressions not to match the captured expressions.

By incorporating surface feature contours and corrective shapes into model production, images (and other types of outputs) may be produced from an animation model 108 that is capable of reconstructing subtle expressions and emotions from an actor's performance. As such, accurate eye blinks and lip motions may be delivered by the animation model 108 for providing intended emotions and substantially readable lips. Once created, the animation model 108 may be used for a variety of applications, for example, the actor's performance may be retargeted to a deformable mesh of vertices that represent the actor 110 (referred to as an actor's rig), a fictional creature 112 (referred to as a creature's rig), etc. associated with an offline application (e.g., a motion picture), an online application (e.g., a video game), etc. Further, in some arrangements the animation model 108 may be updated after being constructed. For example additional representations, contours, correctives shapes, etc. may be used for producing and updated version of the animation model (e.g., that is capable of reproducing additional facial expressions, etc. from an actor's performance).

Figure 2:
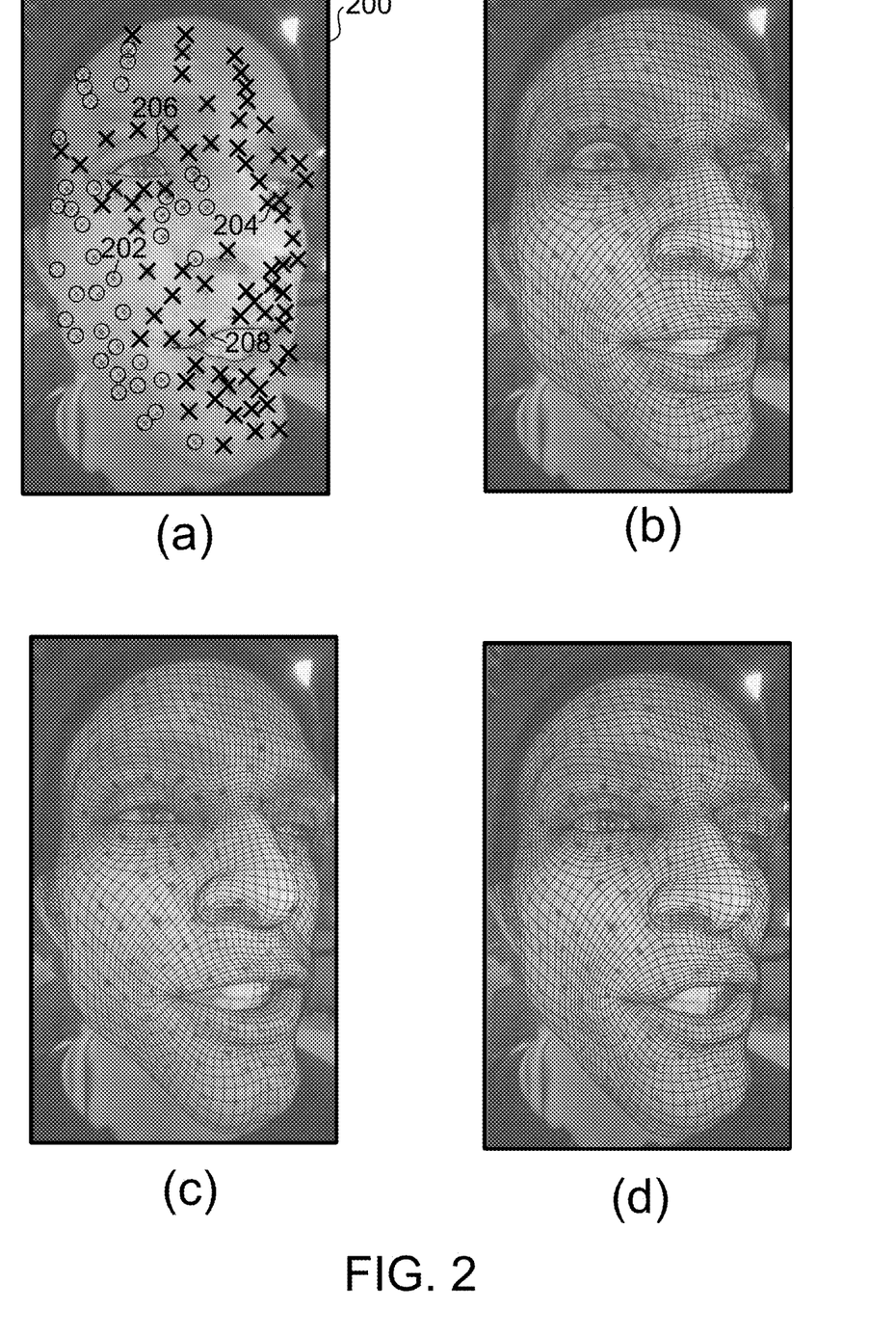
FIGS. 2(a)-(d) illustrate collected information used for producing a model capable of representing facial expressions of an actor.

Referring to FIG. 2, in some arrangements the animation system 100 produces the animation model 108 (both shown in FIG. 1) from input information that includes the captured imagery (e.g., frames from video streams, etc.) of the actor's facial performance along with a deformable mesh of vertices that represents a base expression of the actor's face (e.g., a neutral facial expression) and a set of blendshapes for changing the facial expression being represented. From this information, the animation system 100 produces the animation model 108 for reconstructing the facial performance on the deformable mesh (such as a rig) to match the features of the captured imagery. As represented by FIG. 2(a), a single image 200 is presented from the video frames captured by one of the head-mounted cameras (i.e., the camera 104 for capturing the right side of the actor's face). From the captured imagery, position information may be estimated using one or more techniques (e.g., a pattern tracking algorithm) for tracking the markers applied to the actor's face. In general, position information is provided by the two-dimensional information from the camera images plane and converted into three-dimensional information for high quality animations. In this particular example, markers represented with circles 202 represent markers only captured by the camera 104 mounted to view the right side of the actor's face, and are capable of being processed to attain two-dimensional position information. Crossed lines 204 represent markers captured by both cameras (i.e., the camera 104 for capturing the right side of the actor's face and the camera 106 for capturing the left side of the actor's face) and are capable of providing three-dimensional position information.

Corresponding points on the neutral expression mesh can be calculated for the markers capable of providing two-dimensional position information (represented by the circles 202). For example, a point x on the mesh surface may be represented by barycentric coordinates: x=AX, where A is the barycentric coordinates in matric form, and X is a vector of the vertices of the mesh. For a given 2D marker m and the corresponding point x on the mesh surface, we define a fitting error as their distance on an image plane.

$$c_m(x) = \begin{bmatrix} \langle Q_2, x\rangle \tilde{m}_x - \langle Q_0, x\rangle \\ \langle Q_2, x\rangle \tilde{m}_y - \langle Q_1, x\rangle \end{bmatrix} \quad (1)$$

where $\langle , \rangle$ denotes dot product, and $Q_i$ denotes the rows of the camera projection matrix Q. This constraint is linear in the vertex positions X.

For markers that can be viewed by both cameras (represented in image 200 with crossed lines 204), one or more techniques may be implemented for estimating the three-dimensional positions. For example, a bundle adjustment technique may be used for estimating the positions of these markers along with a constraint to fit a bundle $\tilde{p}$.

$$c_p(X) = AX - \tilde{p} \quad (2)$$

The 3D bundle constraint is also linear in X. In general, available markers are typically used for each frame or image, so the number of constraints may vary across frames.

Figure 3:
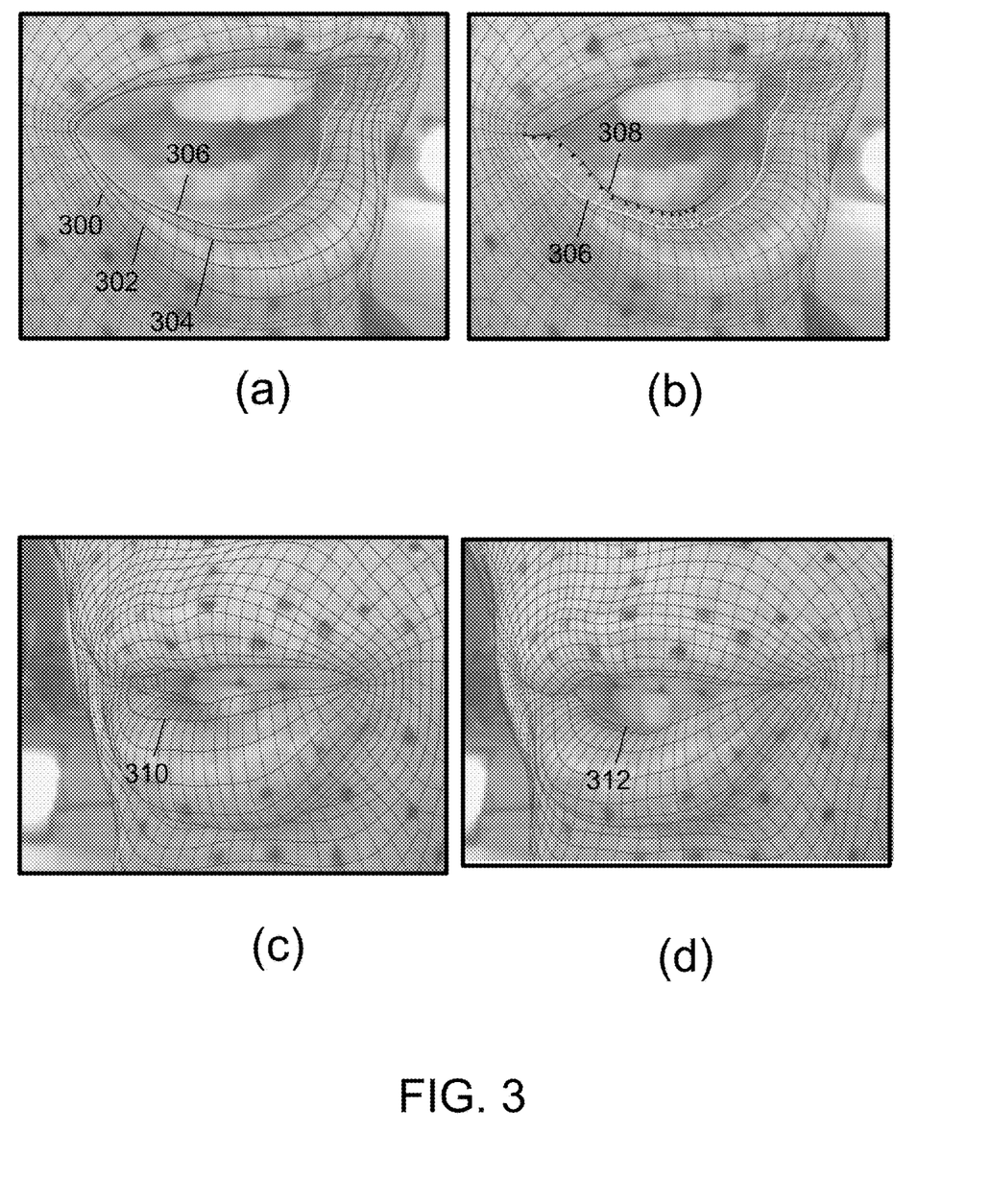
FIGS. 3(a)-(d) illustrate contours of an actor's mouth.

In addition to the position information provided from the markers, contour information is provided for facial features represented in the image. For example, contour 206 provides an outline of upper and lower lids of the actor's right eye, and, contour 208 outlines the silhouette of the inner lips of the actor, which emanates from the corner of the mouth and extends to the center of the actor's mouth. Unlike fixed contours for outer lips or nasolabial folds, contours such as contour 208 are free to slide on the mesh surface. For example, the silhouette of the inner mouth changes when the lip rolls out. One or more techniques may be implemented for defining the contours represented in the image 200 (or other images). For example, the contours may be manually defined by an animator, editor, etc. or may be automatically defined by one or more processes (e.g., executed by the computer system 102). In some arrangements data that represents the contours (e.g., coordinates that define a contour) may be used (e.g., by the computer system 102) along with the other information for producing an animation model. In other arrangements, data representing contours may be processed prior to being used in model production. For example, one or more quantities that represent a correspondence between a contour and one or more mesh edges may be defined and used by the computer system for model production. Referring briefly to FIG. 3a, in the mouth region of the actor, a series of looped-shaped curves 300, 302, 304, 306 are highlighted that may be used. As show in FIG. 3b, a silhouette contour 308 (also referred to as an occluding contour) is defined as an edge that represents a boundary between the visual and hidden portion of the actor's mouth. Since the geometry of the actor's lips typically changes with time, such curves and silhouette contours change from image to image (e.g., from frame to frame in a video) and are defined for each image. After a silhouette contour has been defined and a curve selected, a correspondence between the two can be defined. In one arrangement, a correspondence may be defined by projecting the vertices of the silhouette contour 308 and aligning end-points of the contour with end-points of the selected curve 306. Rather using a single curve, in some arrangements, multiple curves may be used for tracking a mouth area. For example, two curve segments may be used for tracking a lower lip and two segments may be used for tracking an upper lip. In one example, each segment may be defined from the middle of the respective lip to a corresponding end point of the lip. Once the points are defined, a mapping technique (e.g., an arc-length based mapping) may be used to define correspondences between the curves and the silhouette contour defined by the inner lips of the actor.

For some facial features, other information may be used for assisting with defining silhouette contours and their relation to mesh curves. For example, since eyelids slide over the surface of the cornea, the geometry of the eye may be used for projecting the eyelid curves onto the cornea to attain three-dimensional curvature information.

For each image, frame of video, etc., 2D marker constrains and 3D bundle constraints, including the constraints for the tracked curves, are used to execute an optimization calculation. In general, the energy E can be considered the squared L2 error of a stack of constraint vectors. Initially, an optimization calculation is executed to solve for blendshape weights w that substantially match the tracked markers and curves. Given a neutral mesh $b_0$ and the blendshape basis as a matrix B, the calculation attempts to fit the deformed mesh $X(w) = b_0 + Bw$ to the input features.

$$\min_w \sum_{i=1}^{2} \omega_i E_i(w) \quad s.t. \quad -1 \le w \le 1 \quad (3)$$

As provided by equation (3), two energies are fitting the 2D markers and fitting the 2D curves respectively, with the appropriate weights $\omega$. Since the constraints are linear to the blendshape weights, the calculation is solved, for example, using quadratic programming. By executing the calculation, a deformed shape, $\tilde{X}$, is produced in the blendshape subspace.

Depending on the quality of the blendshapes, $\tilde{X}$ may not completely capture the given performance of the actor accurately. An improved the match of the constraints may be achieved by implementing one or more techniques. For example, improvement may be provided by solving for one or more corrective shapes, $\Delta X$, without inducing noise or over-fitting. In general, such an optimization may include five energy terms. In addition to the two previous terms represented in equation (3), 3D point constraints for the mesh boundary, 3D curves (e.g., for the eyelids), and a cotangent weighted Laplacian constraint as regularization to prevent arbitrary changes to the geometry may be introduced.

$$\min_w \sum_{i=1}^{5} \omega_i E_i(w) \quad (4)$$

Because the resulting constraints are linear, a solution can be achieved, for example, using QR factorization to obtain the least-square solution through back substitution. The final shape X* combines the solutions from both optimizations:

$$X^* = \tilde{X} + \Delta X \quad (5)$$

Returning back to FIG. 2, images are presented for comparing the ability to match the actor's face with an animation model. For example, FIG. 2(b) presents a mesh deformed by an animation model produced absent information provided from contours defined for the lips and eyes of the actor. While the mesh provides a reasonable match to facial expression of the actor, the mesh does not substantially track the lips and eye lids of the actor. In FIG. 2(c), defined contour information is included in calculation for producing the animation model. As represented in the figure, the mesh overlaid upon the actor's facial expression provides a closer match in the eye lids. Compared to the underlying expression, the mouth region of the mesh appears to slightly deviate from the actor's mouth. Referring to FIG. 2(d), one or more corrective shapes are computed and included with the animation model. As represented in the figure, additional deformations are applied to a mesh overlaid upon the image of the actor's face. Comparing the mesh and the underlying image, incorporating the corrective shapes into the animation model adjusts the mouth region of the mesh (e.g., including the inner lip shape and corner of the mouth) to provide a closer match to the facial expression.

Referring to FIGS. 3(c) and (d), another illustration of the ability of an animation model to track the shape of an actor's mouth by using a silhouette contour is presented. FIG. 3(c) illustrates with a contour 310 in which incorrect deformations may result from an animation model constructed without one or more silhouette contours for the mouth region. Alternatively, by incorporating such silhouette contours in the production of the animation model, a closer match to the complex rolling motion of the actor's lips may be achieved as illustrated by a contour 312 in FIG. 3(d).

Figure 4:
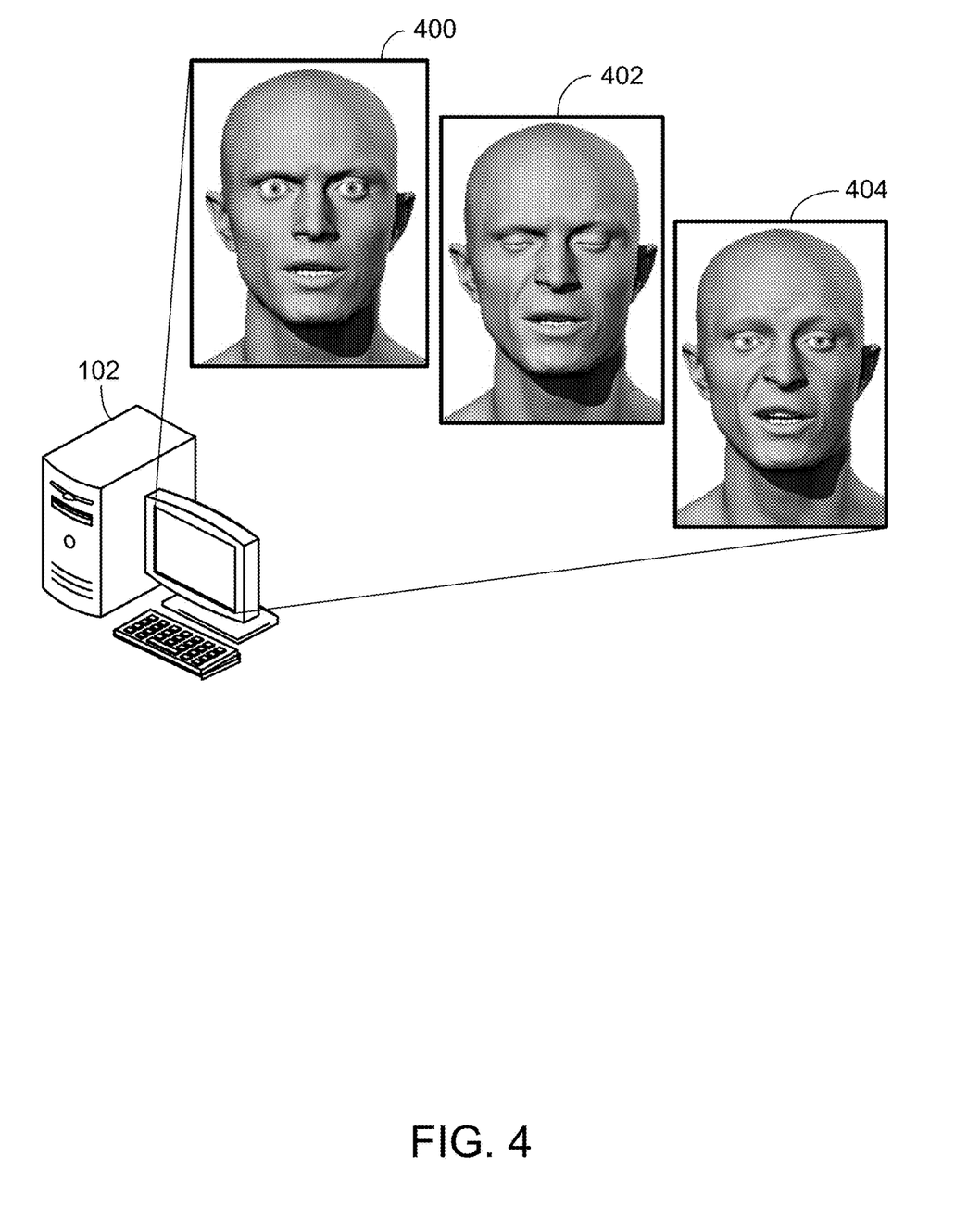
FIG. 4 illustrates editing expressions provided by a model of an actor's face.

Referring to FIG. 4, along with providing closely matching representations to an actor face, the produced animation models provide for other functionality such as editability. As illustrated in the figure, three images 400, 402, 404 are presented of an actor's rig that tracks the performed facial expression of an actor. Image 400 presents an initial facial expression of the actor in which both eyes are in open positions along with the actor's mouth. By allowing blendshapes associated with the animation model to be adjusted, the presented facial expression may be edited. For example, as shown in image 402, adjustments may be executed for placing the eye lids in a closed position and slightly raisin the upper lip. In image 404, other adjustments may be added such as raising both eyebrows to allow and animator, editor, etc. to produce a slightly different emotion. Once edited, the adjustments may be used for updating the animation model such that the newly adjusted facial expressions may be reconstructed by applying the appropriate weight or weights to the blendshapes associated with the animation model.

Figure 5:
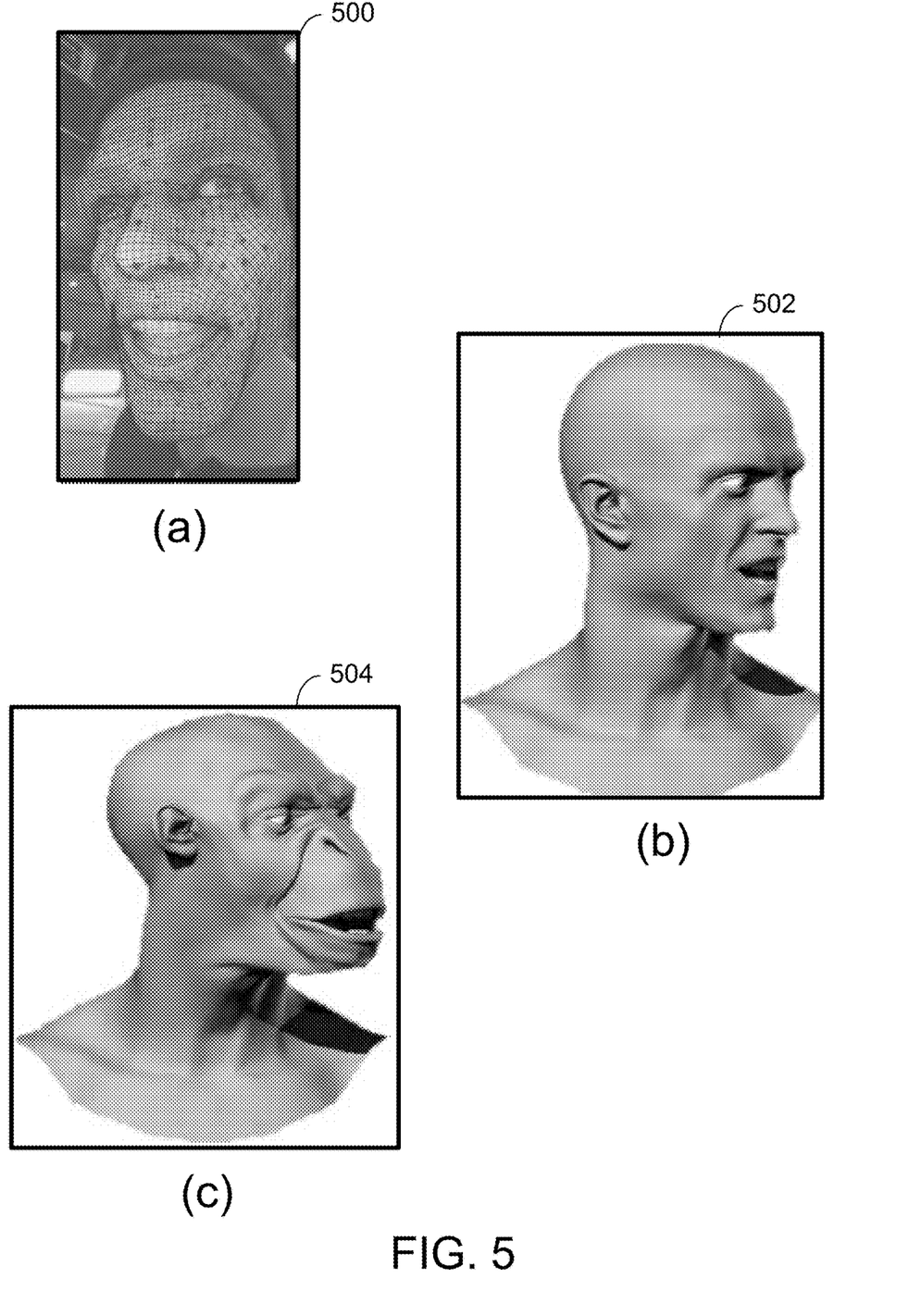
FIGS. 5(a)-(c) illustrates mapping an actor's facial expression to a representation of the actor and a representation of a character.

Referring to FIG. 5, along with allowing facial expressions to be edited, the produced animation models may also be used for other application such as retargeting an actor's performance. For example, the performance may be retargeted for animating the face of a non-human creature using the animation model. After producing an animation model, a facial expression (e.g., provided by a captured video frame 500) may be transferred to an actor's rig or a creature's rig as respectively illustrated with images 502 and 504. One or more techniques may be implemented (e.g., a deformation transfer algorithm) for transferring the facial expression information associated with actor to the rigs. Through this transfer, the actor's performance is re-created on the geometry of the representation of the actor and the creature, which can be creatively adjusted by an animator, editor, etc. if needed. In some arrangements, corrective shapes may be applied to the animation model and retargeted to the rigs represented in the images 502 and 504 to improve the overall quality of the retargeted performances and capture subtle skin movements, and thereby produce compelling life-like movement in the facial regions.

Figure 6:
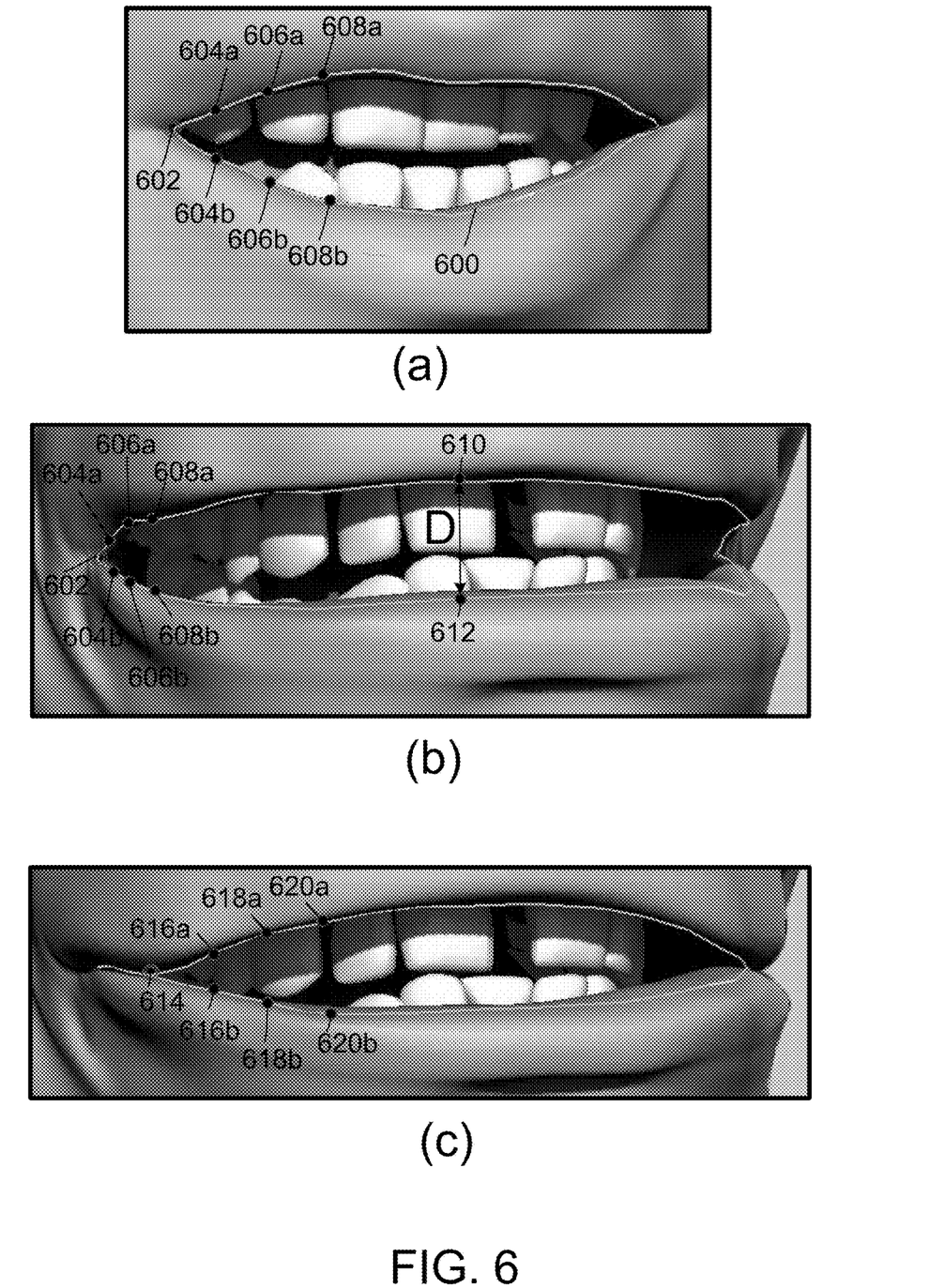
FIG. 6(a)-(c) illustrates adjustments to a characters mouth for tracking an actor's performance.

Referring to FIG. 6, based on the geometry of the target character, particular regions of the character's face may need adjustment for appropriately tracking the actor's performance. For example, in some situations, the geometry of a creature's mouth may be significantly larger than the geometry of the actor's mouth. As such, retargeting the actor's performance to the creature's rig may not produce a lip readable animation being presented by the creature. In general, transferring the shapes of the actor's mouth (e.g., when providing dialogue) may cause semantic correspondence to be lost between points on the inner lips of the actor's mouth when resculpted to the creature's mouth.

One or more techniques may be implemented for mapping the shape of the actor's mouth to the creature's mouth to address this issue. For example, one or more portions of the creature's mouth may be constrained to more closely match the geometry of the actor's mouth. In one arrangement, the length of the talking portion of the creature's inner lip contours may be approximately matched to the length of the actor's inner lips. Various methodologies may be implemented for approximately matching the two lengths, for example, end points on the creature's inner lip contours may be adjusted to correspondence to the corners of the actor's lips.

Illustrated in FIG. 6(a), the mouth portion of an actor's rig is shown in which the mouth is open (and both upper and lower teeth are exposed) for this particular instant in time. To quantify the shape of the mouth, a silhouette contour 600 defines the boundary of the inner lips. A series of points are also defined that are positioned on the silhouette contour 600 to assist in quantifying the shape of the open month. From a corner point 602, points 604a, 606a, 608a are positioned on the upper portion of the silhouette contour 600 and points 604b, 606b, 608b are positioned on the lower portion of the contour. In this example, the three pairs of points 604a,b, 606a,b and 608a,b are used in conjunction with the corner point 602 for demonstrative purposes; however, more or less points may also be defined in some arrangements. Further, this example focuses on the right side of the actor's and creature's mouth for demonstrative purposes. Similar points may also be defined for other portions of the mouths.

Referring to FIG. 6(b), the shape of the actor's mouth is mapped to the much wider mouth of the creature by aligning the corner point 602 to a corner point of a corresponding contour of the creature's mouth. As illustrated, due to the elongated size of the creatures mouth, the shape of the actor's mouth does not map and the shape for of the creature's mouth has little if any resemblance to shape of the actor's mouth. To provide an improved mapping, one or more techniques may be implemented. For example, the corners of the creatures mouth may be adjusted my closing one or more portions of the creatures mouth such that the speaking portion of the mouth more closely resembles the actor's mouth. Referring to FIG. 6(c), the corner of the creature's mouth is adjusted such that the creature in effect appears to talk using a smaller portion of its mouth. In this example, the extreme right side portion of the creature's mouth is sealed to effectively move the corner of the creature's mouth closer towards its midpoint. One or more techniques may be implemented to define the portion of the creature's mouth to seal for adjusting the corner point. For example, a vertical separation threshold may be defined such that the creature's mouth is sealed at the points where the threshold is not met or exceeded. In one arrangement, the separation threshold is defined as a percentage (e.g., 50%) of the vertical separation distance ("D") at the midpoint of the creature's mouth (as represented by the pair of corresponding points 610 and 612). For point pairs that do not meet or exceed this separation threshold, the respective portion of the character's mouth is sealed. For example, the vertical distance separation between point pair 604*a* and 604*b*, point pair 606*a* and 606*b*, and point pair 608*a* and 608*b* are each compared to the defined threshold (e.g., 50% of D). As illustrated in FIG. 6(*c*), the right side of the creature's mouth is closed at the location of point pairs that did not meet or exceed this threshold, thereby correspondingly shifting the corner of the character's mouth towards the middle of the mouth to a new corner point 614. Once the new corner point 614 is set, the location of the point pairs (604*a* and 604*b*, 606*a* and 606*b*, 608*a* and 608*b*) from the actor's rig can be recomputed for positioning on the creature's rig (e.g., point pairs 616*a* and 616*b*, 618*a* and 618*b*, 620*a* and 620*b*). In this example, adjustments to the right side of the creature's mouth are graphically demonstrated; however, similar operations may also be executed for the left side of the creature's mouth. Further, adjustments may be applied to other portions of the creature's mouth, independent of, or in combination with adjustments to the right and/or left side. Once adjusted, the corresponding animation model may be updated for appropriate reconstruction of the facial expressions. In some arrangements, one or more corrective shapes may be used for adjusting the creature's mouth to appropriately track the shape of the actor's mouth. Individual points such as corner points may also be editable by animators, editors, etc. in some arrangements to further assist in attempting to match the overall performance of an actor.

Figure 7:
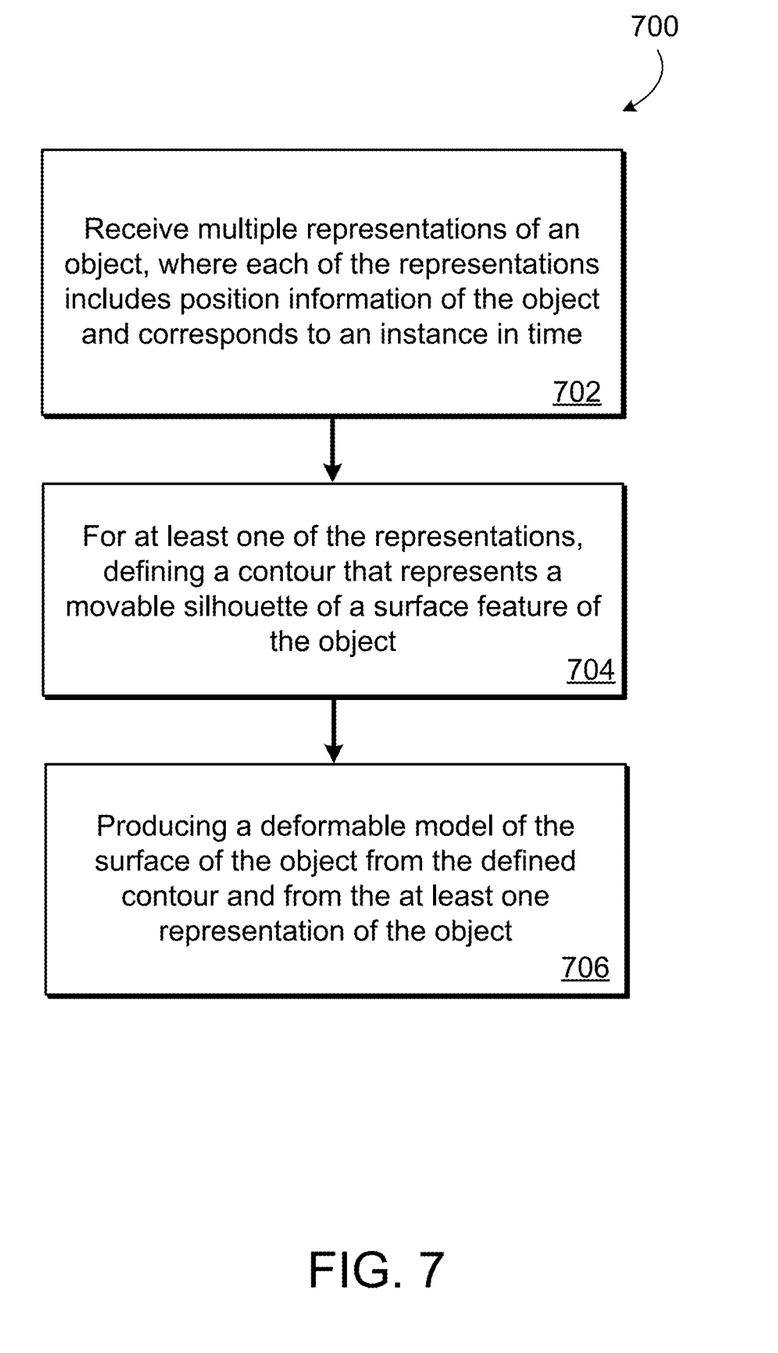
FIG. 7 is a flow chart of operations for producing an animation model.

Referring to FIG. 7, a flowchart 700 represents operations of a computing device such as the computer system 102 (shown in FIGS. 1 and 4) to produce an animation model from one or more contours of a facial feature included in an image (e.g., of an actor's face captured by one or more cameras, etc.). Such operations are typically executed by components (e.g., one or more processors) included in a computing device, however, operations may be executed by multiple computing devices. Along with being executed at a single site, operations execution may be distributed among two or more locations.

Operations of the computing device may include receiving 702 multiple representations of an object. Each of the representations includes position information of the object and corresponds to an instance in time. For example an actor's face may be captured by one or more cameras (or other type of image capture device) to provide a series of images of facial expressions performed by the actor. Each of the captured images typically corresponds to one instance in a period of time. Operations may also include, for at least one of the representations, defining 704 a contour that represents a movable silhouette of a surface feature of the object. For example, a contour of a silhouette formed by the boundary of the inner and outer lips of the actor's mouth may be defined by one more techniques. In some arrangements, the contour may be defined in an automated process executed by the computer system. Such contours may also be manually defined by an animator, editor, etc. in some arrangements. Operations also include producing 706 a deformable model of the surface of the object from the defined contour and from the at least one representation of the object. For example, an animation model may be produced from contour information and a neutral facial expression captured from the actor. In some arrangements, corrective shapes may be produced for the animation model if the model is incapable of accurately presenting captured facial expressions of the actor. Once the corrective shapes are applied, the animation model can be used for various applications such as retargeting the facial expressions to a rig that reflects the actor's face, a fictional creature, etc. for use in online productions (e.g., a video game title) or offline productions (e.g., a motion picture).

Figure 8:
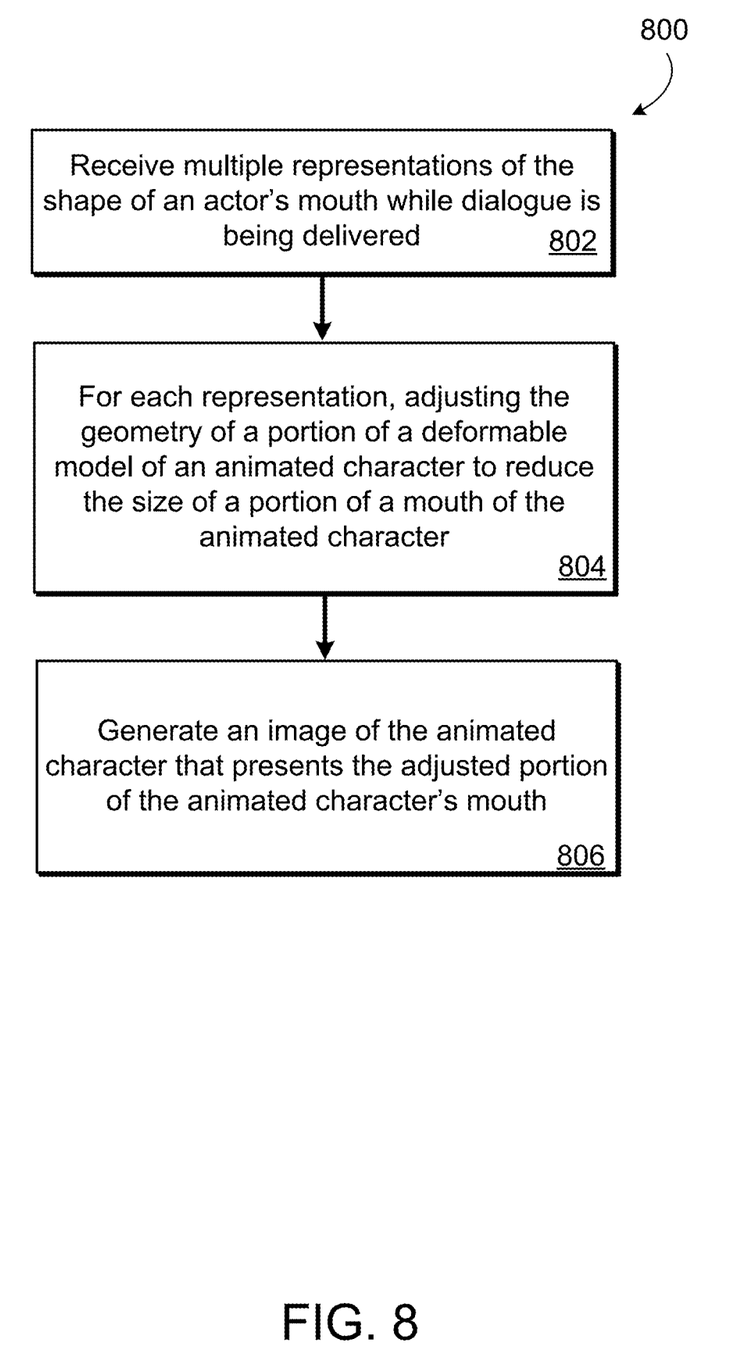
FIG. 8 is a flow chart of operation for adjusting the mouth represented by an animation model.

Referring to FIG. 8, a flowchart 800 represents operations of a computing device such as the computer system 102 (shown in FIGS. 1 and 4) to adjust an animation model (e.g., of a fictional creature) to more realistically present appropriate mouth shapes for dialogue performed by an actor. Such operations are typically executed by components (e.g., one or more processors) included in a computing device, however, operations may be executed by multiple computing devices. Along with being executed at a single site, operations execution may be distributed among two or more locations.

Operations of the computing device may include receiving 802 multiple representations of the shape of an actor's mouth while dialogue is being delivered. For example, the shape of the actor's mouth may be captured by one or more cameras in a series of images, video frames, etc. From the captured imagery, data points may be calculated that define the shape of the actor's mouth and how the shape changes over the period of time that the imagery was collected. Operations may also include, for each representation, adjusting 804 the geometry of a portion of a deformable model of an animated character to adjust (e.g., reduce, enlarge, etc.) the size of a portion of a mouth of the animated character. For example, a rig that represents the face of a fictional creature may be adjusted such that the mouth of the character is reduced in size to better reflect the shape of the actor's mouth and thereby provide nearly readable lips for the creature that track with the actor's dialogue and provide a less distracting and more realistic viewing experience. Operations may also include generating 806 an image of the animated character that presents the adjusted portion of the animated character's mouth. For example, electronic, hardcopy, film copies, etc. of the animated character presenting the dialogue of the actor may be generated for an online production (e.g., a video game title) or offline production (e.g., a motion picture).

Figure 9:
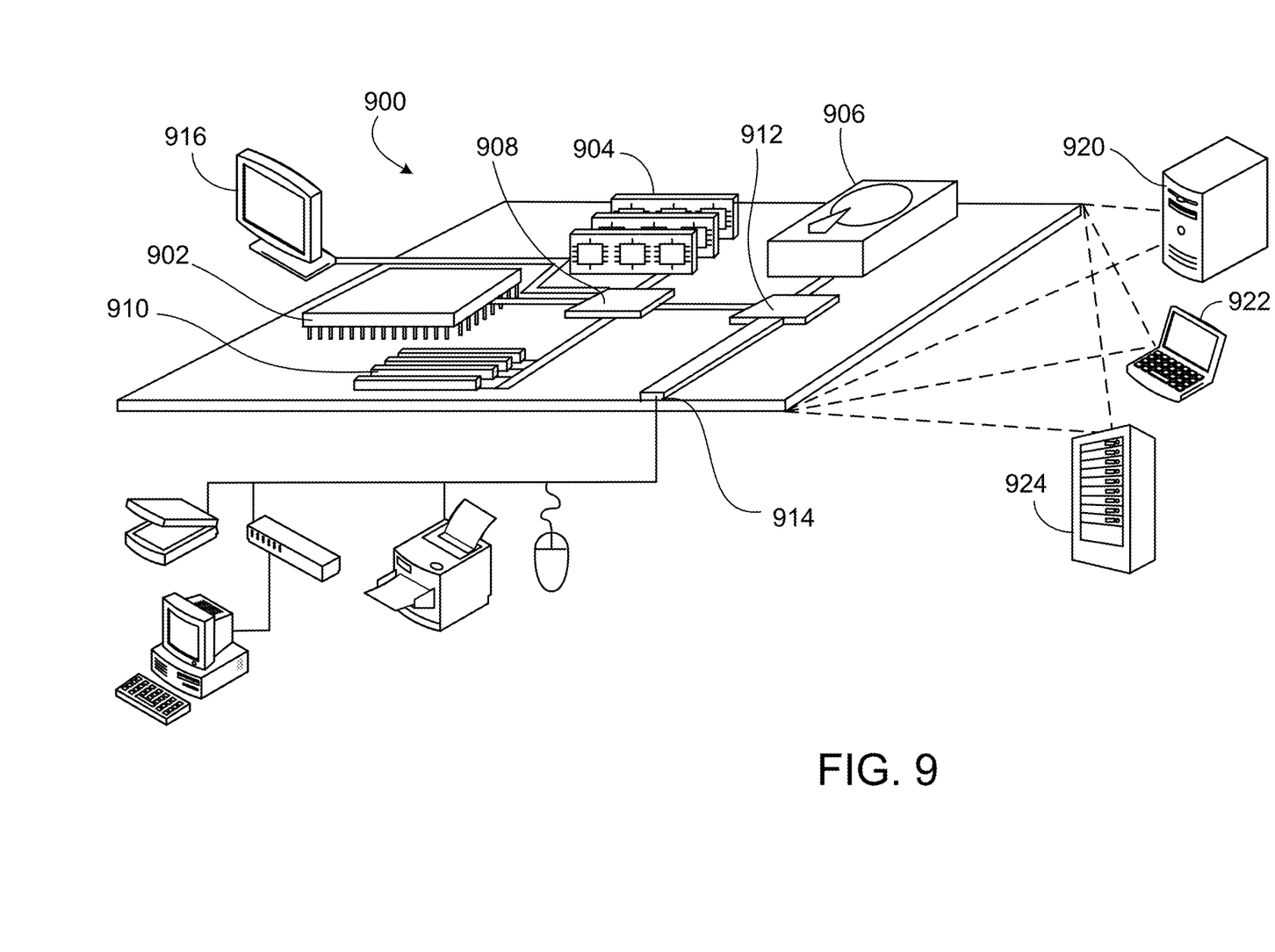
FIG. 9 shows an example of a computing device that can be used in connection with computer-implemented methods and systems described in this document.

FIG. 9 shows an example of a computing device 900 and that can be used to implement the techniques described for producing an animation model. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is exemplary only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown). Each of such devices may contain one or more of the computing device 900 and the mobile computing device, and an entire system may be made up of multiple computing devices communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, the method being implemented by one or more of a processor configured to execute machine-readable instructions, the method comprising:
   receiving multiple images of a face of a person, wherein each of the images include position information indicating positions of a set of features on the face of the person and corresponds to an instance in time, wherein the set of features include a first curve in an eye region of the person;
   for each of the multiple images, defining, based on the position information, a silhouette contour that corresponds to a movable boundary between a visual portion and a hidden portion of an eye of the person, wherein the silhouette contour is defined such that the silhouette contour represents the first curve;
   producing a deformable model of a surface of the face based on at least one image of the multiple images of the face and the silhouette contour;
   defining separation thresholds for a portion of the deformable model;
   generating one or more corrective shapes based on the silhouette contour and correspondence between the silhouette contour and the first curve defined in the images; and
   correcting the eye region on the deformable model corresponding to the silhouette contour by applying the one or more corrective shapes to the deformable model wherein applying the corrective shapes to the deformable model includes adjusting an eyelid shape or a corner of the eye region of the deformable model based on the separation thresholds.

2. The computer-implemented method of claim 1, wherein producing the deformable model includes defining an association between a first contour that represents the silhouette contour of the eye region and a mesh of vertices that represents the face.

3. The computer-implemented method of claim 1, wherein the silhouette contour further corresponds to a second curve on the face, and wherein the one or more corrective shapes are generated further based on correspondence between silhouette contour and the second curve.

4. The computer-implemented method of claim 1, wherein correcting on the deformable model applying the one or more corrective shapes to the deformable model includes adjusting a geometry of the eye of the person.

5. The computer-implemented method of claim 4, wherein adjusting the geometry of the eye of the person includes closing the portion of the eye of the person.

6. The computer-implemented method of claim 5, wherein adjusting the geometry of the eye of the person includes defining a separation threshold for closing the portion of the eye of the person.

7. A system comprising:
   a computing device comprising:
      a memory configured to store instructions; and
      a processor configured to execute the instructions to perform a method comprising:
         receiving multiple images of a face of a person, wherein each of the images include position information indicating positions of a set of features on the face of the person and corresponds to an instance in time, wherein the set of features include a first curve in an eye region of the person;
         for each of the multiple images, defining, based on the position information, a silhouette contour that corresponds to a movable boundary between a visual portion and a hidden portion of an eye of the person, wherein the silhouette contour is defined such that the silhouette contour represents the first curve;
         producing a deformable model of a surface of the face based on at least one image of the multiple images of the face and the silhouette contour;
         defining separation thresholds for a portion of the deformable model;
         generating one or more corrective shapes based on the silhouette contour and correspondence between the silhouette contour and the first curve defined in the images; and
         correcting the eye region on the deformable model corresponding to the silhouette contour by applying the one or more corrective shapes to the deformable model, wherein applying the corrective shapes to the deformable models to adjust the eye region of the deformable model includes adjusting an eyelid shape or a corner of the eye region based on the separation thresholds.

8. The system of claim 7, wherein producing the deformable model includes defining an association between a first contour that represents the silhouette contour of the eye region and a mesh of vertices that represents the face.

9. The system of claim 7, wherein the silhouette contour further corresponds to a second curve on the face, and wherein the one or more corrective shapes are generated further based on correspondence between silhouette contour and the second curve.

10. The system of claim 7, wherein the processor is further configured to perform:
    producing an updated deformable model of the surface of the face from the produced deformable model and another contour defined from another one of the received multiple images of the face.

11. The system of claim 7, wherein correcting the eye region on the deformable model applying the one or more corrective shapes to the deformable model includes adjusting a geometry of the eye of the person.

12. The system of claim 11, wherein adjusting the geometry of the eye of the person includes closing the portion of the eye of the person.

13. The system of claim 12, wherein adjusting the geometry of the eye of the person includes defining a separation threshold for closing the portion of the eye of the person.

14. A non-transitory computer readable medium having executable instructions stored thereon that when executed by a processor perform a method comprising:
    receiving multiple images of a face of a person, wherein each of the images include position information indicating positions of a set of features on the face of the person and corresponds to an instance in time, wherein the set of features include a first curve in an eye region of the person;

for each of the multiple images, defining, based on the position information, a silhouette contour that corresponds to a movable boundary between a visual portion and a hidden portion of an eye of the person, wherein the silhouette contour is defined such that the silhouette contour represents the first curve;

producing a deformable model of a surface of the face based on at least one image of the multiple images of the face and the silhouette contour;

defining separation thresholds for a portion of the deformable model;

generating one or more corrective shapes based on the silhouette contour and correspondence between the silhouette contour and the first curve defined in the images; and correcting the eye region on the deformable model corresponding to the silhouette contour by applying the one or more corrective shapes to the deformable model, wherein applying the corrective shapes to the deformable models to adjust the eye region of the deformable model includes adjusting an eyelid shape or a corner of the eye region based on the separation thresholds.

15. The non-transitory computer readable medium of claim 14, wherein producing the deformable model includes defining an association between a first contour that represents the silhouette contour of the eye region and a mesh of vertices that represents the face.

16. The non-transitory computer readable medium of claim 14, wherein the silhouette contour further corresponds to a second curve on the face, and wherein the one or more corrective shapes are generated further based on correspondence between silhouette contour and the second curve.

17. The non-transitory computer readable medium of claim 14, having executable instructions stored thereon executable instructions stored thereon that when executed by a processor perform a method further comprising:

producing an updated deformable model of the surface of the face from the produced deformable model and another contour defined from another one of the received multiple images of the face.

18. The non-transitory computer readable medium of claim 14, wherein correcting the eye region on the deformable model applying the one or more corrective shapes to the deformable model includes adjusting a geometry of the eye of the person.

19. The non-transitory computer readable medium of claim 18, wherein adjusting the geometry of the eye of the person includes closing the portion of the eye of the person based on a separation threshold.

* * * * *